US010451190B2

(12) United States Patent
Goehler et al.

(10) Patent No.: US 10,451,190 B2
(45) Date of Patent: Oct. 22, 2019

(54) PRESSURE RELEASE VALVE FOR OIL RECOVERY SYSTEMS

(71) Applicants: Dannie Goehler, Tulsa, OK (US); Gary Scantlin, Tulsa, OK (US)

(72) Inventors: Dannie Goehler, Tulsa, OK (US); Gary Scantlin, Tulsa, OK (US)

(73) Assignee: BS&B Innovations Limited, Limerick (IE)

( * ) Notice: Subject to any disclaimer, the term of this patent is extended or adjusted under 35 U.S.C. 154(b) by 0 days.

(21) Appl. No.: 15/308,275

(22) PCT Filed: May 1, 2015

(86) PCT No.: PCT/US2015/028802
§ 371 (c)(1),
(2) Date: Nov. 1, 2016

(87) PCT Pub. No.: WO2015/168558
PCT Pub. Date: Nov. 5, 2015

(65) Prior Publication Data
US 2017/0059049 A1  Mar. 2, 2017

Related U.S. Application Data

(60) Provisional application No. 61/996,246, filed on May 2, 2014.

(51) Int. Cl.
*F16K 17/14* (2006.01)
*F16K 17/40* (2006.01)
(Continued)

(52) U.S. Cl.
CPC ............ *F16K 17/406* (2013.01); *E21B 34/06* (2013.01); *F16K 17/0466* (2013.01)

(58) Field of Classification Search
CPC ..... F16K 17/406; F16K 17/0466; E21B 34/06
(Continued)

(56) References Cited

U.S. PATENT DOCUMENTS 2,092,819 A    9/1937  Tennant
2,771,091 A *  11/1956  Baker .................... E21B 21/10
                                                    137/454.2
(Continued)

FOREIGN PATENT DOCUMENTS

CN         103486305 A      1/2014
GB           343902 A      12/1963
(Continued)

OTHER PUBLICATIONS

International Search Report and Written Opinion of the International Searching Authority, Application No. PCT/US2015/028802, dated Sep. 22, 2015 (12 pages).

(Continued)

*Primary Examiner* — Minh Q Le
(74) *Attorney, Agent, or Firm* — Finnegan, Henderson, Farabow, Garrett & Dunner, LLP

(57) ABSTRACT

The disclosure relates to a pressure release valve (100). The pressure release valve may be suitable for use as an oil recovery valve. In one embodiment, the pressure release valve may comprise a piston (5) and tube (4) configured to slide within a valve body, wherein the piston is configured to remain sealingly engaged with the tube until the pressure release valve fully activates. Upon activation, the piston may disengage from the tube, thereby allowing fluid to escape from the valve through the tube.

19 Claims, 3 Drawing Sheets

(51) Int. Cl.
*F16K 17/04* (2006.01)
*E21B 34/06* (2006.01)

(58) Field of Classification Search
USPC .......... 137/68.17, 68.11, 464, 467, 511, 515;
251/73, 94, 324
See application file for complete search history.

(56) References Cited

U.S. PATENT DOCUMENTS

| | | | |
|---|---|---|---|
| 3,035,808 A | 5/1962 | Knox | |
| 3,410,304 A * | 11/1968 | Paul, Jr. | F16K 17/042 137/494 |
| 3,592,222 A * | 7/1971 | Goss | F16K 17/042 137/467 |
| 3,845,784 A * | 11/1974 | Sullivan | E21B 21/10 137/515 |
| 4,248,264 A * | 2/1981 | Hadsell | E21B 21/106 137/454.2 |
| 4,436,279 A | 3/1984 | Bonds et al. | |
| 4,451,047 A | 5/1984 | Herd et al. | |
| 4,724,857 A * | 2/1988 | Taylor | F16K 17/406 137/538 |
| 4,749,043 A | 6/1988 | Rodenberger | |
| 4,825,895 A | 5/1989 | Maltman | |
| 4,903,938 A * | 2/1990 | Nishizawa | F16K 1/34 251/129.16 |
| 4,921,000 A | 5/1990 | King et al. | |
| 5,322,261 A | 6/1994 | Aarnes | |
| 5,577,523 A * | 11/1996 | Taylor | F16K 17/406 137/15.18 |
| 5,829,952 A * | 11/1998 | Shadden | E21B 34/06 137/533.25 |
| 5,860,442 A | 1/1999 | Taylor | |
| 6,015,134 A | 1/2000 | Johnson | |
| 6,058,961 A | 5/2000 | Taylor | |
| 6,283,152 B1 | 9/2001 | Corte, Jr. et al. | |
| 6,425,410 B1 * | 7/2002 | Taylor | F16K 17/406 137/467 |
| 6,626,471 B2 | 9/2003 | Mallis | |
| 6,698,712 B2 | 3/2004 | Milberger et al. | |
| 6,698,715 B2 | 3/2004 | Smith, Jr. et al. | |
| 6,799,597 B1 * | 10/2004 | Taylor | F16K 17/19 137/458 |
| 6,866,244 B2 | 3/2005 | Wears | |
| 7,357,151 B2 | 4/2008 | Lonnes | |
| 7,520,297 B2 | 4/2009 | Bell et al. | |
| 7,523,916 B2 | 4/2009 | Fenton et al. | |
| 8,550,117 B2 | 10/2013 | McCarty et al. | |
| 8,690,534 B1 | 4/2014 | Janocko et al. | |
| 8,701,779 B2 | 4/2014 | Kleppa et al. | |
| 8,915,260 B2 | 12/2014 | Klein | |
| 9,057,448 B2 | 6/2015 | Lymberopoulos et al. | |
| 9,739,385 B1 * | 8/2017 | Lattimer | F16K 17/0426 |
| 2004/0144938 A1 | 7/2004 | Akselberg | |
| 2007/0056629 A1 | 3/2007 | Klein | |
| 2010/0148108 A1 | 6/2010 | Glaun | |
| 2010/0288960 A1 * | 11/2010 | Taylor | F16K 17/406 251/324 |
| 2011/0197978 A1 * | 8/2011 | Harji | B25B 27/0028 137/511 |
| 2013/0199622 A1 | 8/2013 | Tomasko | |
| 2013/0233409 A1 | 12/2013 | Grawunde | |

FOREIGN PATENT DOCUMENTS

| | | |
|---|---|---|
| GB | 1228827 A | 4/1971 |
| GB | 2103310 A | 2/1983 |
| JP | 55018617 B1 | 7/1975 |
| JP | 2010-261569 A | 11/2010 |
| JP | 2012137171 A | 7/2012 |
| WO | 2013033382 A1 | 3/2013 |

OTHER PUBLICATIONS

First Office Action, Chinese Patent Application No. 201580033228.3 (dated May 11, 2018), with translation (13 pages total).
Second Office Action, Chinese Patent Application No. 201580033228.3 (dated Dec. 11, 2018), with translation (6 pages total).

* cited by examiner

PRESSURE RELEASE VALVE FOR OIL RECOVERY SYSTEMS

CROSS REFERENCE TO RELATED APPLICATIONS

This application claims the benefit of U.S. Provisional Application No. 61/996,246, filed May 2, 2014, by Dan Goehler, et al., and titled OIL RECOVERY VALVE, the disclosure of which is expressly incorporated herein by reference.

FIELD OF THE DISCLOSURE

This disclosure generally relates to a valve for protection against overpressure situations. More specifically, this disclosure relates to a valve suitable for use in downhole oil recovery operations.

BACKGROUND

Recovering oil from an underground deposit may include a downhole oil recovery operation, where pressurized fluid is pumped into an oil-containing formation or oil deposit. In general, the pressurized fluid may be used to increase the pressure within a formation or oil deposit and thereby force the oil outward or upward to the surface for collection. A downhole oil recovery operation may involve high pressures; therefore, there is a need for a mechanism to protect the oil recovery systems (e.g., the pumps, piping, instruments, and ancillary components of the pumping system) from potentially damaging over-pressurization. One such mechanism may include a valve, which may be configured to open when a predetermined pressure is reached, thereby allowing pressure to escape before failure occurs.

An oil recovery valve may be exposed to fluctuating high pressures, which may cause the valve to oscillate or "chatter" without fully opening, which may allow nuisance leakage or oscillating leakage from the valve into the environment. Such leakage may be undesirable. Such leakage may, for example, allow oil deposits to accumulate on, in, or around valve components or other components of the pumping system. Such oil deposits may pose a safety concern to the environment around a valve (e.g., causing slippage), or may negatively impact the maintenance or operation of the valve. There is a need for an oil recovery valve that reduces or eliminates nuisance leakage or oscillating leakage.

One example of an oil recovery valve uses a buckling pin to set the pressure at which the valve may be opened. Examples of a buckling pin valve are disclosed in co-owned U.S. patent application Ser. No. 11/221,856 (U.S. Pub. No. 2007/0056629) and co-owned U.S. patent application Ser. No. 13/573,200 (U.S. Pub. No. 2013/0199622), the entire contents of each of which is expressly incorporated herein by reference. A buckling pin valve is configured to translate the pressure inside a system into a compressive or buckling force on the buckling pin. Once a predetermined pressure in the system is reached (corresponding to a predetermined compressive force on the buckling pin), the buckling pin will buckle and allow the valve to open and release pressure from the system. When the pressure returns to a safe level, the valve may be reseated and a new buckling pin may be inserted into the system. There is a need for a system that facilitates access to an installed buckling pin, e.g., for removal and replacement. There also is a need for a system that facilitates access to and/or allows the use of a buckling pin (or other failure member) provided as part of a pin cartridge.

Because the opening pressure of a buckling pin valve may be set by the buckling pin, it may be desirable to provide a buckling pin valve that may be used with buckling pins of different cross-sectional shapes (e.g., circular or polygonal), dimensions (e.g., length, diameter), materials (e.g., steel, titanium), or surface features (e.g., notches, scoring) to facilitate buckling or otherwise change the force that may be required for the pin to buckle. It also may be desirable to provide a system wherein the buckling pin is protected from damage or tampering that might weaken the buckling pin or otherwise change the buckling pin's performance. It further may be desirable to provide a system wherein a different type of failure mechanism may be used, such as, e.g., different types of failure pins (including a breaking pin, shear pin, tension pin, torsion pin, or other suitable failure member component configured to fail in response to a predetermined stress or strain). It also may be desirable to provide a deformable activation component, such as a spring, cam release, or other mechanical release, configured to control the pressure at which a valve may open.

The present disclosure discloses embodiments of an oil recovery valve that may achieve one or more of the foregoing (or other) benefits.

SUMMARY

To overcome one or more of the deficiencies in the prior art, provide one or more of the benefits above, or to overcome other deficiencies and/or provide other benefits, as embodied and described herein, the disclosure is directed to a pressure release valve, comprising a valve body defining a first bore and a second bore, the valve body further defining a fluid flowpath. The pressure release valve further comprises a piston having a first end, wherein the piston is configured to slide within the first bore, and a tube having a second end, wherein the second end of the tube is configured to sealingly engage with the first end of the piston, and wherein the tube is further configured to slide within the second bore while the second end and first end are sealingly engaged. The first end of the piston may be configured to disengage from the second end of the tube upon activation of the valve. The tube may be configured to transmit fluid to the fluid flowpath when the first end of the piston is disengaged from the second end of the tube.

The disclosure also is directed to a pressure release valve comprising a valve body, comprising a main body defining a first central bore, the first central bore having a first shoulder portion, and an inlet member defining a second central bore, the second central bore having a second shoulder portion, wherein the first central bore and the second central bore are aligned to define a tube cavity between the first and second shoulder portion. A floating bean tube may be disposed within the tube cavity, the floating bean tube having an inlet, an outlet and an outer surface, wherein the floating bean tube is configured to slide axially within the tube cavity, and wherein the outer surface of the floating bean tube is configured to maintain a fluid-tight seal with the main body and the inlet member. A piston plug may be slidably disposed within the first central bore, the piston plug having a first end and a second end, the first end engaged to seal the outlet of the floating bean tube. The pressure release valve may further comprise a release mechanism, wherein the piston plug is configured to transmit a force to the release mechanism, and wherein the piston plug is configured to become unsealed from the outlet of the floating bean tube when the release mechanism activates.

BRIEF DESCRIPTION OF THE DRAWINGS

The accompanying drawings, which are incorporated in and constitute a part of this specification, illustrate embodiments of the disclosure and, together with the description, serve to explain principles of the disclosure.

DESCRIPTION OF THE EMBODIMENTS

Reference will now be made in detail to the present exemplary embodiments, examples of which are illustrated in the accompanying figures.

Figure 1:
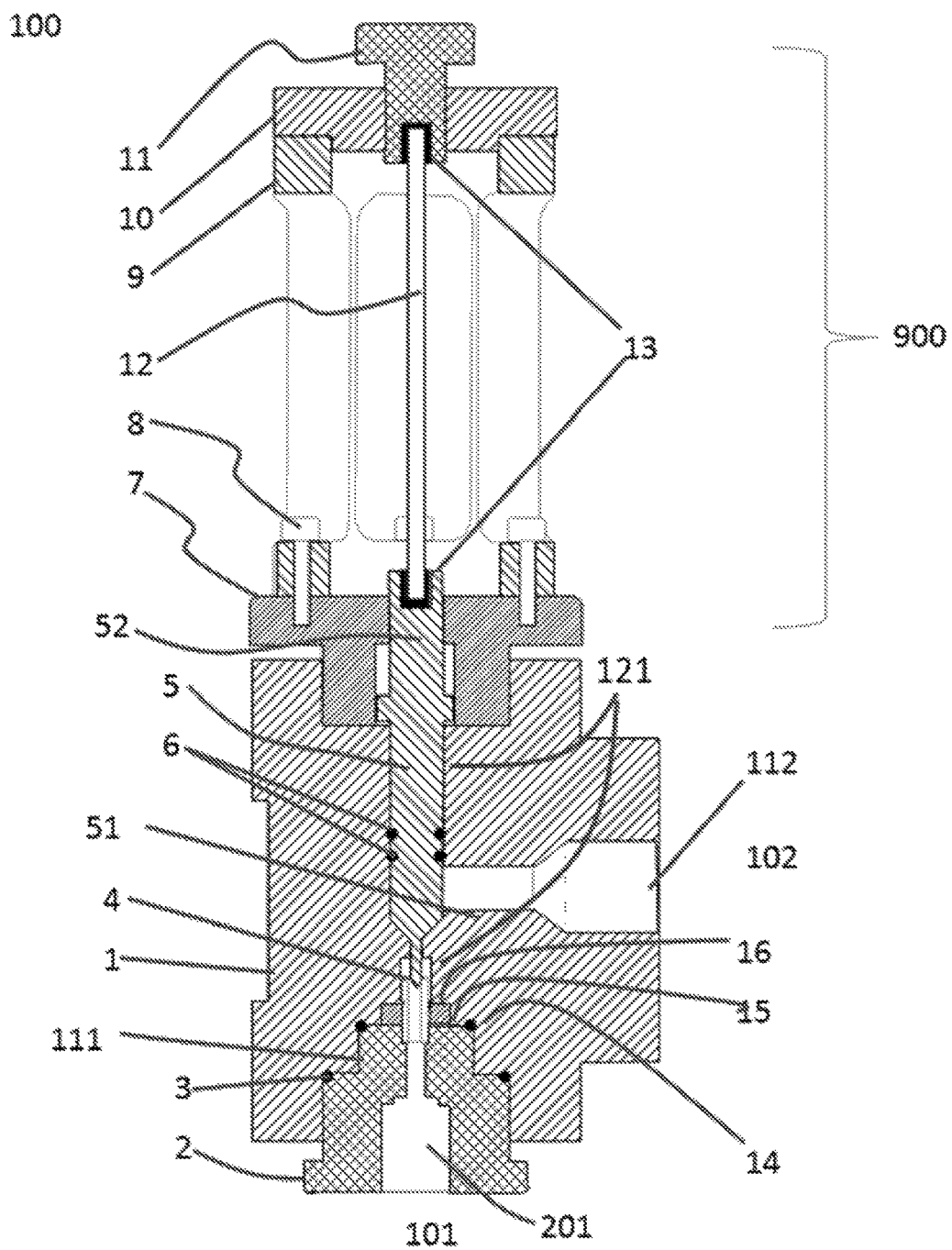
FIG. 1 is a cross-sectional illustration of a pressure release valve.

FIG. 1 illustrates one embodiment of an oil recovery valve 100. As illustrated, the oil recovery valve 100 has an inlet 101 and an outlet 102. The inlet 101 may be exposed to the pressurized system (e.g., a downhole oil recovery pumping system), and the oil recovery valve 100 may be configured to allow pressurized fluid to escape from the inlet 101 through the outlet 102 when the valve 100 is opened.

Oil recovery valve 100 may include a main body 1 having an inlet bore 111 and an outlet bore 112. An inlet member 2 may engage with the inlet bore 111. For example, as illustrated in FIG. 1, the inlet member 2 may be at least partially inserted within the inlet bore 111 of main body 1, and one or more seals 3, 14 may be provided to create a sealing engagement between the main body 1 and inlet member 2. The inlet member 2 may include a central bore 201, which provides a fluid flow path from the pressurized system to the main body 1. A sealing mechanism 15 (e.g., a sealing cartridge), may be provided between the inlet member 2 and the main body 1. The sealing mechanism 15 may be sealingly engaged with the main body 1 and/or the inlet member 2 by way of a seal 16. The sealing mechanism 15 further may be sealingly engaged with a floating bean tube 4. In one embodiment, a sealing mechanism 15 may be configured to float within the valve body—e.g., such that the sealing mechanism 15 may move coaxially with the tube 4; however, in another embodiment, the sealing mechanism 15 may be secured to the valve body and constrained against moving with the tube 4.

Although not illustrated in FIG. 1, the central bore 201 of the inlet member 2 may be provided with an extension, tubing, or other feature to direct fluid into the valve. Similarly, an extension, tubing, or other feature may be provided with outlet bore 112 to direct a released fluid away from the valve.

The inlet member 2 may engage with the main body 1 by any suitable means. For example, the inlet member 2 may have a threaded outer surface that may be screwed into a mated threaded inner surface of the inlet bore 111. In another embodiment, the inlet member 2 may have a flanged connection to the main body 1, wherein mated flanges of the inlet member 2 and main body 1 are screwed, clamped, or otherwise attached together.

It may be desirable for the inlet member 2 to be easily removed from the main body 1, so that it may be replaced. For example, the inlet member 2 may be exposed to damaging high pressures, high heat, or corrosive conditions. In the event of damage due to such conditions, the valve 100 may be reconditioned by replacing only inlet member 2 (rather than main body 1 or other components). As another example, making inlet member 2 replaceable may allow the same valve 100 to be adaptable to different environments or applications. For example, in certain applications, it may be sufficient for inlet member 2 to be fabricated from steel; whereas in other environments, it may be desirable for inlet member 2 to be fabricated from a material (such as, e.g., Hastelloy) that is more resistant to corrosion or harsh conditions. Making the inlet member 2 easily replaceable allows the rest of the valve 100 components to be used for different applications with a simple substitution of the inlet member 2. As yet another example, it may be desirable to replace the inlet member 2 to have a different diameter of central bore 201 to optimize the rate or characteristics of fluid flow through the valve 100.

Figure 1A:
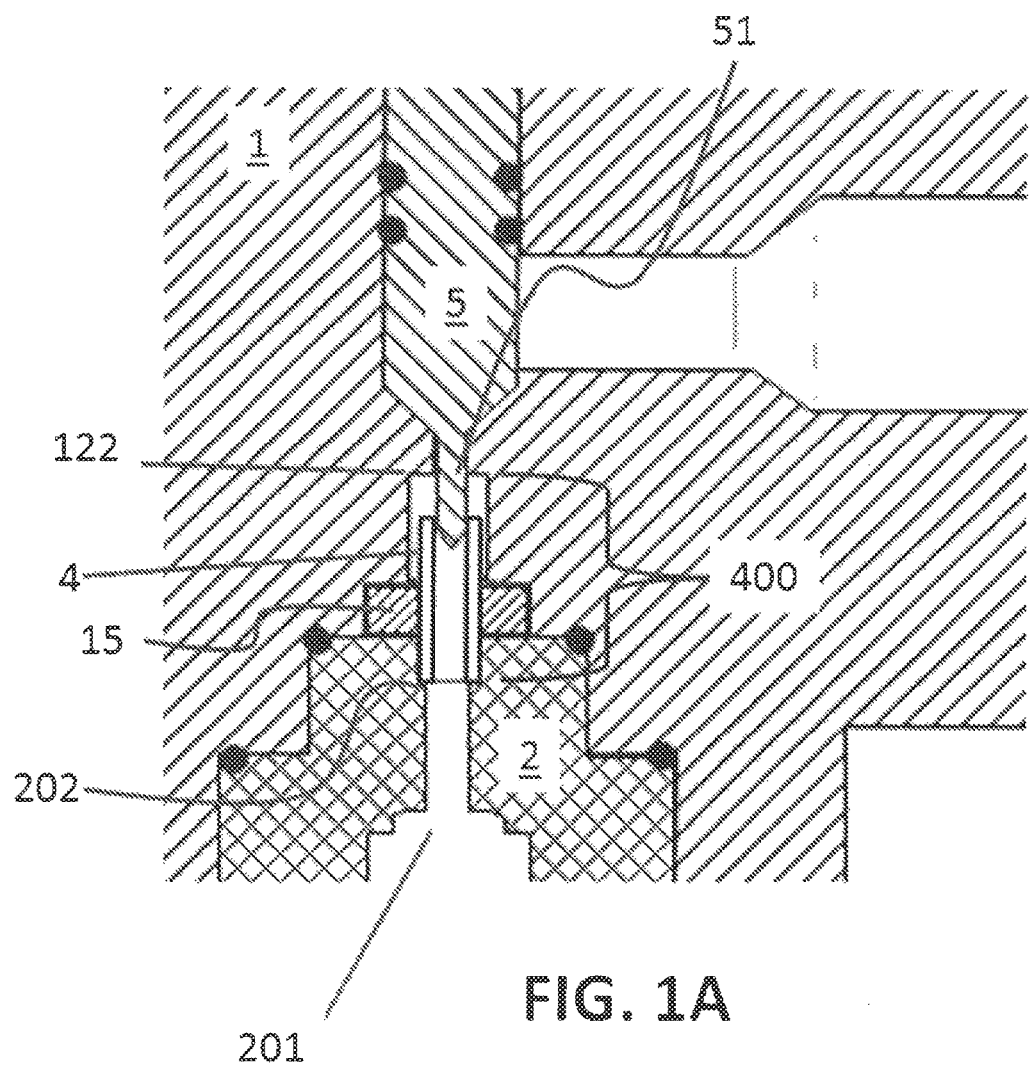
FIG. 1A is a detail view of a pressure release valve.

A central bore 121 of the main body 1 has an upper portion shaped to receive a piston plug 5. The piston plug 5 may be provided with one or more seals 6 to ensure a fluid-tight, slidable relationship between the piston plug 5 and a central bore 121 of the main body 1. The central bore 121 also includes a lower portion shaped to receive the upper extent of a floating bean tube 4. As illustrated, the lower portion of the central bore 121 has a smaller diameter than the upper portion. A shoulder 122 (FIG. 1A) is provided between the upper and lower portions of the central bore 121. The shoulder 122 is configured to prevent the floating bean tube 4 from sliding upward beyond the shoulder 122.

The central bore 201 of the inlet member 2 has an upper portion shaped to receive the lower extent of a floating bean tube 4. As illustrated, a shoulder 202 (FIG. 1A) is provided to prevent the floating bean tube 4 from sliding downward beyond the shoulder 202.

The central bores 121, 201 of the main body 1 and inlet member 2 are aligned to form a tube cavity 400. The floating bean tube 4 is positioned within the tube cavity 400. The floating bean tube 4 may slide a short distance relative to the main body 1 and inlet member 2 (i.e., within the tube cavity 400 between shoulder 122 and shoulder 202), while maintaining a fluid-tight seal with the main body 1, sealing mechanism 15, and inlet member 2.

A first end 51 of the piston plug 5 is engaged with an opening of the floating bean tube 4 to plug the bean tube 4. In one embodiment, the first end 51 and floating bean tube 4 may be sealed together. According to this arrangement, as illustrated in FIG. 1, the combined piston plug 5 and bean tube 4 may remain sealed together while sliding relative to the main body 1 and the inlet member 2 for a short distance (i.e., the distance through which the bean tube 4 is allowed to travel in the tube cavity 400). As the piston plug 5 continues to slide upward, the shoulder 122 prevents bean tube 4 from further upward displacement, and the seal between the piston plug 5 and floating bean tube 4 may disengage to allow fluid to pass from the pressurized system through the bean tube 4 and out of the outlet 102 of the valve.

Although the first end 51 of the plug 5 is illustrated as having a "vee" shape at its interface with the tube 4, the disclosure is not limited to that configuration. For example, the first end 51 may terminate in a simple squared-off shape, such that a flat surface engages with an end of the tube 4. As another example, the plug 5 and/or tube 4 may be designed to have a soft-seating arrangement (e.g., using a non-metallic material). Further, the material of the plug 5 and/or tube 4 may be selected depending on the nature of the application and/or the nature of the desired seal or other interaction between the plug 5 and/or tube 4. For example, one or both components may be made from a metal, ceramic, plastic, rubber, or other suitable material.

FIG. 1 further illustrates a failure member assembly 900 mounted on the main body 1. As shown, the failure member assembly 900 includes a failure member cage 9, which has a bonnet section 7 and an end cap 10. As illustrated, the failure member cage 9 is secured to the bonnet section 7 via fasteners 8. The end cap 10 may also be secured to the failure member cage 9 by way of one or more fasteners (not shown). In an embodiment wherein the failure member is a buckling pin, the failure member assembly 900 may be a buckling pin assembly and the failure member cage 9 may be a buckling pin cage.

According to one embodiment, the failure member assembly 900 may be removed from the main body 1 and/or disassembled to provide easy access to the piston plug 5 (e.g., for maintenance). For example, in one embodiment, the bonnet section 7 and the main body 1 may have mated threaded portions, such that the bonnet section 7 may be screwed into and out of the main body 1. As another example, the bonnet section 7 may be attached to the main body 1 by way of screws, clamps, latch assemblies, or any other suitable releasable attachment mechanisms, which may be released to permit access to the piston plug 5.

A failure member 12 may be secured between an adjuster screw 11 and the second end 52 of the piston plug 5. The adjuster screw 11 may be used to pre-load the failure member 12 in compression. Additionally or alternatively, the adjuster screw may be used to facilitate installation of failure members of different lengths. In one or both of the adjuster screw 11 and second end 52 of the piston plug, a bushing 13 may be provided to facilitate engagement with the failure member 12. Bushings 13 may be replaced or exchanged to allow failure members of different diameters or shapes to be used.

In one embodiment, the failure member 12 may be cylindrical (i.e., with a consistent circular cross-section across the length of the member), e.g., a cylindrical buckling pin. The present disclosure also contemplates using failure members with alternate configurations. For example, a failure member may have a polygonal cross-section (e.g., square, rectangular, triangular, octagonal) or a variable cross-section (e.g., square and circular cross-sections at different locations). A failure member may also be provided with surface features (e.g., narrowed or tapered portions, scored portions, or notches). A failure member 12 may be, e.g., a buckling pin configured to buckle in response to a predetermined stress. In another embodiment, another suitable component configured to fail in response to a predetermined stress or strain may be used for the failure member 12 or in place of the failure member 12. For example, it is contemplated that a shear pin or tension pin may be used as a failure member, wherein the shear pin or tension pin is configured to fail in response to a predetermined stress or strain. It is further contemplated that a deformable failure member may be used, such as a spring, Belleville spring, Belleville washer, collapsible bellows, cam release, or other mechanical release, configured to control the pressure at which a valve may open. A failure member 12 may be configured to allow a valve to open via irreversible or, alternatively, reversible deformation of the failure member.

Figure 2:
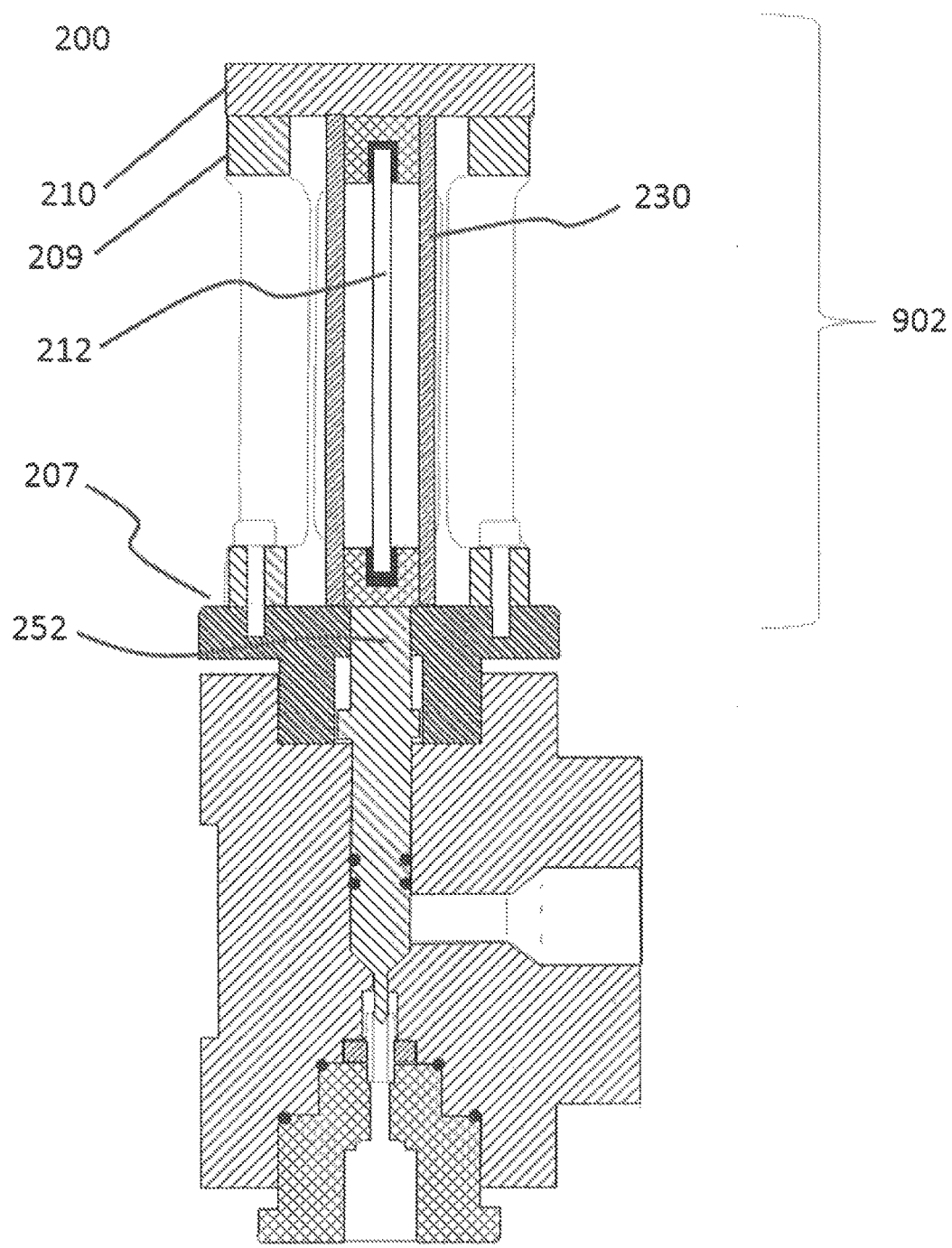
FIG. 2 is a cross-sectional illustration of a pressure release valve including a buckling pin cartridge.

In one embodiment, a failure member may be provided as part of a pre-assembled cartridge for ease of installation or replacement. For example, a failure member cartridge may include a failure member preassembled together with a failure member cage or failure member assembly. In one embodiment (not shown), the piston plug 5 may also be included as part of the preassembled cartridge. As another example, illustrated in FIG. 2, a failure member 212 may be provided in a cartridge 230 separately from a failure member cage assembly 902. The cartridge 230 may be secured within a cage 209 between an end cap 210 and a bonnet section 207, such that force from a piston 252 may be transferred to the failure member 212 within the cartridge 230.

Using a cartridge assembly may facilitate adaptability of a valve. For example, one cartridge may be replaced with elements of a different design to accommodate different failure member designs (e.g., pins having different material, cross-section, profile, diameter, length, or surface features) to change the activation pressure range of the valve.

Now turning to the operation of an oil recovery valve, the valve 100 may be installed with the inlet member 2 exposed to a pressurized system. Pressure applied to the inlet member 2 applies a force to the floating bean tube 4 and the piston plug 5. That force, in turn, is transferred to the failure member 12 in the form of a compressive load.

As the pressure in the pressurized system fluctuates, the failure member 12 may deform (without failing), which allows the piston plug 5 to move a short distance axially relative to the main body 1. In a known valve, such displacement of a piston plug may allow undesirable leakage of fluid from the pressurized system as the valve seal is repeatedly cracked open and shut. According to the present disclosure, however, as the piston plug 5 moves a short distance, the floating bean tube 4 moves with it. In this manner, the sealing surface between piston plug 5 and floating bean tube 4 remains intact, and leakage is prevented.

When pressure in the pressurized system reaches a predetermined level, the compressive force on the failure member 12 causes the failure member to fail (i.e., the valve is activated), which frees the piston plug 5 to slide upward. The floating bean tube 4, however, is constrained to slide only to the shoulder 122. Thus, once the floating bean tube 4 has reached the full extent of its upward motion and the piston plug 5 continues to move upward, the seal between the floating bean tube 4 and the piston plug 5 is broken. Pressurized fluid is thus allowed to flow from the valve inlet 101 through the floating bean tube 4 and out through the valve outlet 102. Once the pressure within the pressurized system has been reduced to a safe level, the failure member 12 may be replaced as described above.

While an oil recovery valve is described above, it is contemplated that the disclosed valve may be used in other applications requiring overpressure protection. Additionally, while a valve is described above as using a buckling pin release mechanism, the disclosure is not limited to that configuration. It is contemplated that other release mechanisms may be used. For example, a piston plug and floating bean tube may be used in combination with a release mechanism in the form of a shear pin, tension pin, spring, Belleville washer, Belleville spring, collapsible bellows, or other suitable mechanism. The release mechanism may utilize a deformable release mechanism, wherein deformation is irreversible (e.g., a buckling pin) or reversible (e.g., a spring). In addition, although a valve configuration is described above as transferring an axial force from a piston plug to a buckling pin release mechanism, it is also contemplated that the force from a piston plug may be translated into a rotational torque via a rotational member, and that a release mechanism may be configured to release in response to a predetermined level of torque.

It is contemplated that individual features of one embodiment may be added to, or substituted for, individual features of another embodiment. Accordingly, it is within the scope of this disclosure to cover embodiments resulting from substitution and replacement of different features between different embodiments.

The above described embodiments and arrangements are intended only to be exemplary of contemplated systems and methods. Other embodiments will be apparent to those skilled in the art from consideration of the specification and practice of the disclosure herein.

What is claimed is:

1. A pressure release valve, comprising:
    a valve body, comprising:
        a main body defining a first central bore, the first central bore having a first shoulder portion; and
        an inlet member defining a second central bore, the second central bore having a second shoulder portion;
        wherein the first central bore and the second central bore are aligned to define a tube cavity between the first and second shoulder portion;
    a floating bean tube disposed within the tube cavity, the floating bean tube having an inlet, an outlet and an outer surface, wherein the floating bean tube is configured to slide axially within the tube cavity, and wherein the outer surface of the floating bean tube is configured to maintain a fluid-tight seal with the main body and the inlet member;
    a piston plug slidably disposed within the first central bore, the piston plug having a first end and a second end, the first end engaged to seal the outlet of the floating bean tube; and
    a release mechanism;
    wherein the piston plug is configured to transmit a force to the release mechanism; and
    wherein the piston plug is configured to become unsealed from the outlet of the floating bean tube when the release mechanism activates.

2. The pressure release valve of claim 1, further comprising:
    a sealing mechanism engaged with the outer surface of the floating bean tube;
    wherein the sealing mechanism is configured to maintain the fluid-tight seal between the floating bean tube, the main body, and the inlet member.

3. The pressure release valve of claim 1, wherein the inlet member defines an outer threaded surface;
    wherein the main body defines an inner threaded surface; and
    wherein the outer threaded surface is configured to threadingly engage with the inner threaded surface.

4. The pressure release valve of claim 1, wherein the release mechanism comprises a failure member assembly.

5. The pressure release valve of claim 4, wherein the failure member assembly includes a failure member selected from the group consisting of a buckling pin, shear pin, tension pin, and a torsion pin.

6. The pressure release valve of claim 1, wherein the release mechanism comprises a deformable activation component.

7. The pressure release valve of claim 6, wherein the deformable activation component is selected from the group consisting of a spring, Belleville spring, Belleville washer, collapsible bellows, and a cam release.

8. The pressure release valve of claim 6, wherein the failure member assembly is configured to releasably engage with the valve body.

9. The pressure release valve of claim 8, wherein the failure member assembly is configured to releasably engage with the valve body via threaded engagement.

10. The pressure release valve of claim 4, wherein the failure member assembly is configured to receive a failure member cartridge.

11. The pressure release valve of claim 1, wherein the sealing mechanism is secured to the valve body.

12. The pressure release valve of claim 1, wherein the sealing mechanism is secured to the tube.

13. The pressure release valve of claim 12, wherein the sealing mechanism is configured to slide coaxially with the tube relative to the valve body.

14. The pressure release valve of claim 1, wherein the first end of the piston forms a flat end surface, wherein the flat end surface is configured to sealingly engage with the second end of the tube.

15. The pressure release valve of claim 1, wherein the first end of the piston forms a v-shape having an apex, wherein the apex is configured to extend into an interior of the tube when the second end of the tube is sealingly engaged with the first end of the piston.

16. The pressure release valve of claim 1, wherein the piston is configured to slide a first distance within the first bore, wherein the tube is configured to slide a second distance within the second bore, and wherein the first distance is greater than the second distance.

17. The pressure release valve of claim 4, wherein the failure member assembly includes at least one failure member;
    wherein the release mechanism is configured to activate when the at least one failure member fails; and
    wherein the second end of the tube is configured to sealingly engage with the first end of the piston while the failure member deforms without failing.

18. The pressure release valve of claim 17, wherein the first end of the piston is configured to disengage from the second end of the tube when the failure member fails.

19. The pressure release valve of claim 1, wherein the pressure release valve is an oil recovery valve.

* * * * *